Sept. 8, 1953  G. W. LAURIE  2,651,279
PRESSURE RESPONSIVE AND INDICATING DEVICE
Filed May 18, 1950
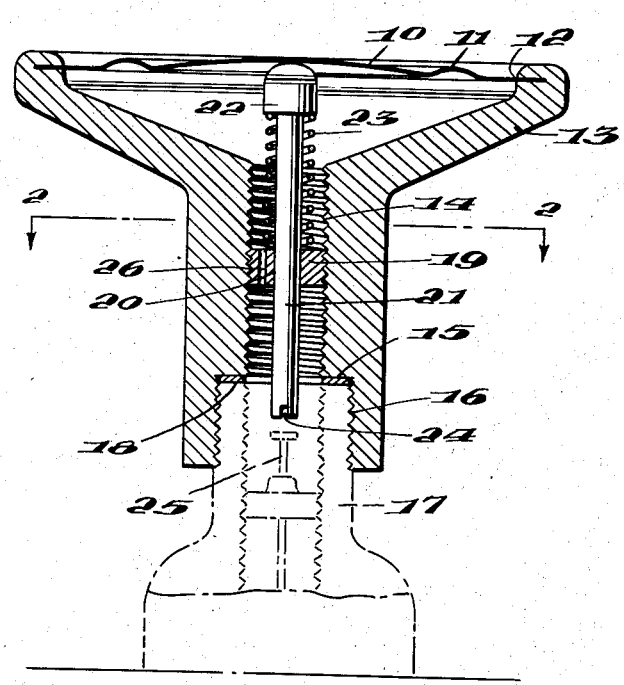
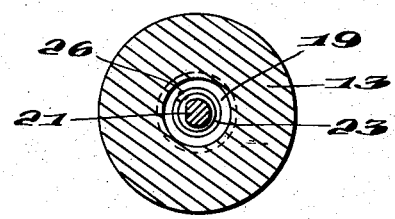
INVENTOR
GAVIN W. LAURIE,
BY
ATTORNEY Patented Sept. 8, 1953

2,651,279

UNITED STATES PATENT OFFICE 2,651,279

PRESSURE RESPONSIVE AND INDICATING DEVICE

Gavin W. Laurie, Springfield, Pa.

Application May 18, 1950, Serial No. 162,673

4 Claims. (Cl. 116—34)

This invention relates to a pressure indicating device, and more particularly to a pneumatic pressure responsive and indicating device adapted to indicate the pressure of pneumatic tires and the like.

It is now a generally accepted fact that the life of a pneumatic tire on a vehicle is dependent, to a large extent, upon the air pressure within the tire. It is also a generally accepted fact that inner tubes of pneumatic tires "leak" slowly and within a comparatively short period of time a pneumatic tire which had a given air pressure therein will have a reduced air pressure due to the aforementioned "leak" of the tube. An under inflated tire wears considerably faster than a tire inflated to its proper pressure.

While nearly every motorist has access to "gasoline filling stations" which have compressed air for tire inflation purposes, the average motorist does not take advantage of such tire inflation service as frequently as he should, with the result that his car is in operation over long periods of time with under inflated tires. Unfortunately, the average motorist is careless about checking the air pressure in his tires to determine if they have the necessary minimum air pressure. This carelessness is attributed to the fact the motorist might soil his hands if he checked the air pressure of his tires, coupled with the effort which he would extend and the time consumed. Frequently the motorist will not permit the attendant to check his tires (even if requested to do so) because, normally, the motorist is in a hurry to be on his way after he has purchased gasoline. However, it is thought that if the motorist could ascertain that one or more of his tires was under inflated without the usual problems mentioned above, he would then take the necessary time to have the attendant inflate the particular tire or tires which were under inflated.

The present invention has been devised to enable the motorist to check the air pressure within each of his tires, without encountering any of the aforementioned problems, to determine if it is equal to or above a predetermined minimum in an expeditious manner while the attendant is filling his automobile with gasoline.

The prime object of this invention is to provide a simple, lightweight, inexpensive device which may be detachably secured to the valve stem of a pneumatic tire, which device may be easily actuated manually to indicate, by sound, sight or touch, whether or not the pressure within the tire is equal to or above a predetermined pressure.

Another important object of the invention is to provide a pressure indicating device which may be easily and quickly adjusted to vary the minimum pressure to later be indicated.

Another important object of the invention is to provide a pressure indicating device for pneumatic tires which is capable of functioning as an indicator for a predetermined minimum air pressure and as a dust cap, the device being intended to replace the customary dust caps.

Still another important object of the invention is to provide a combined pressure indicating device and dust cap which may be detachably secured to the valve stem of a pneumatic tire, so that the device may be easily and quickly removed when it becomes necessary to add air to the tube.

Another object of the invention is to provide a combined pressure indicating device, dust cap, and valve stem seal to seal the air in the tire in the event of a leaky tire valve.

A further object of the invention is to provide a pneumatic tire pressure indicator, dust cap and valve stem seal which has relatively few moving parts, thus eliminating wear.

Further objects and advantages of the invention will be apparent from the following specification and drawings.

In the drawings:

Fig. 1 is a vertical section of the combined dust cap and tire pressure indicator detachably secured to the tire valve stem, the latter being shown in dotted lines;

Fig. 2 is a sectional view on line 2—2 of Fig. 1;

Fig. 3 is a fragmentary detailed view of the audible indicating diaphragm shown in a partially depressed mid-portion, as compared to the normal position of the diaphragm as shown in Fig. 1; and, Fig. 4 is a fragmentary detailed view of the diaphragm structure shown in the fully depressed position.

Referring now to the drawings, the combined tire pressure indicator, dust cap and valve stem seal of the present invention is provided with a spring snap diaphragm indicated by reference numeral 10 which is normally bowed outwardly and is designed to be movable between two different positions, the normally bowed outward position as shown in Fig. 1, through the position as shown in Fig. 3, to the bowed inward or depressed position as shown in Fig. 4. The diaphragm 10, which may be formed of light gauge steel or the like is constructed so as to move between the two aforementioned positions with a snap action, such action emanating an audible sound or click upon each movement, whether inward or outward. As is clearly indicated in the drawings, the diaphragm 10 is preferably provided with a novel form of S-shaped (in cross section) annular ring portion 11 which facilitates the snap action without straining the external circumference of the diaphragm. The external circumference of the diaphragm is sealed air tight as indicated by reference numeral 12 to the flared or enlarged end of the axially bored body member 13 by crimping, soldering or the like, the body member being preferably of conical shape. As the outer peripheral edge of the diaphragm is permanently and rigidly held to the body, the necessary absorption of the metal movement is taken up in the S-shaped wave depressions. The flared end of bored body cooperates with the diaphragm to provide a pressure chamber on the underside of the diaphragm.

The central neck portion of the conical body member 13 is provided with an axially threaded bore 14, the latter being in communication with the axial bore of the enlarged or flared end of the device. The threaded bore 14 is also enlarged at its inner end to provide a shoulder 15 and an enlarged threaded bore 16. The threaded bore 16 has a suitable diameter to correspond to the normal diameter of a threaded valve stem, as indicated at 17 in dotted lines. Thus, the device may be detachably secured to a valve stem in a manner similar to the customary dust cap. A gasket member 18 seats on the shoulder 15 to effect an air and dust tight seal between the bore of the valve stem and the atmosphere.

An adjustable collar 19 having external threads thereon is positioned within the bore 14. The collar 19 has a centrally positioned bore 20, through which a plunger shaft or stem 21 is slidably but non-rotatably mounted as shown in Fig. 2. The plunger shaft 21 is provided with an enlarged head 22 which is positioned to centrally contact the inner surface of the diaphragm 10. A compression spring 23 surrounds the periphery of the plunger shaft 21 and is positioned between the shoulder of the enlarged head 22 and the adjustable collar 19, under compression.

The inner end of the plunger stem 21 is notched as indicated by reference numeral 24, the notch being adapted to receive a screw driver or the like for purposes of axial adjustment of the collar 19 relative to the diaphragm, the function of which is explained in more detail hereinafter.

As previously mentioned, the outer periphery of the annular ring portion 11 of diaphragm 10 is sealed to the flared or enlarged end of the device, thus preventing egress or ingress of air or dust from the bores 14 and 15 to the atmosphere. When the device is secured to a tire valve shown in Fig. 1, the gasket 18 prevents ingress or egress of air or dust from the valve stem to the atmosphere. Accordingly, the device functions as a dust cap and as a valve stem seal, should the valve 25 within the stem 17 leak.

In operation, the diaphragm 10 is manually depressed by the operator's thumb or finger from the position shown in Fig. 1 to the position as shown in Fig. 4. When such depression is accomplished the diaphragm emanates an audible click so as to indicate to the operator that the diaphragm has been sufficiently depressed for pressure indicating purposes. Upon the depression of the diaphragm 10, the plunger 21 is moved inwardly a sufficient distance to contact and depress the valve stem 25 of the tire valve within the stem 17, thereby releasing air pressure of the tube into the bores 16 and 14 of the body 13, the pressure passing through an aperture 26 formed in the collar 19, and hence into the air tight chamber formed by the flared end of the body and the diaphragm 10. It should be noted at this point that the compression spring 23, while being weak, will urge the plunger 21 outwardly against the inner surface of the diaphragm 10 to return the diaphragm to its normal outwardly bowed position. However, the compression of the spring is insufficient to accomplish this function in and of itself and it requires the combined predetermined air pressure and spring to return the diaphragm to its normal outwardly bowed or convex position. Thus, if the air pressure within the tire enters the chamber on the under side of the diaphragm with a predetermined minimum value or more, such predetermined air pressure cooperates with the compression of the spring 23 to move the diaphragm from the manually depressed position shown in Fig. 4 to its outwardly bowed position as shown in Fig. 1, and such movement emanates an audible click, which sound is of sufficient intensity to be heard by the operator. The operator will know immediately that the air pressure within the tire or tube is equal to or above the minimum predetermined value. On the other hand, if the air pressure within the tire is below the minimum predetermined value, the combined forces of the air pressure on the under side of the diaphragm 10 and the compression spring 23 will be insufficient to move the diaphragm to its outer position and, accordingly, there will be no audible sound and the operator will immediately know that the pressure within the tire is below the predetermined minimum. Under such circumstances, it will be obvious that the entire device may be easily and quickly removed in the same manner as the removal of the customary dust cap and, thereafter, the tire or tube may be pumped to the proper air pressure.

Obviously, all pneumatic tires are not intended to have the same minimum air pressure and in order to utilize the present invention to indicate different minimum air pressure values, the same may be easily adjusted by the motorist. This adjustment may be accomplished with the use of a screw driver which is applied to the notch 24 formed in the stem 21 to rotate the stem. As previously mentioned, the stem 21 is keyed in the bore 20 of the collar 19 and hence rotation of the stem will rotate the collar through the cooperation of the screw threads to move the collar in either direction, thereby increasing or decreasing the compression of compression spring 23. It will be obvious, of course, that if the collar 19 is moved toward the diaphragm, the compression of the spring 23 is increased so that less air pressure is needed to cooperate with the spring to force the diaphragm outwardly from its inward position and, conversely, movement of the collar 19 away from the diaphragm will decrease the compression of the spring 23 which in turn will necessitate a higher air pressure to cooperate with the spring to force the diaphragm outwardly.

The body 13 is preferably constructed of any suitable lightweight material, such as aluminum, aluminum alloy, plastic or the like to hold the overall weight of the device to a minimum, although it will be understood, of course, that any suitable materials may be used to construct the device consistent with the natural requirements of the various elements described.

From the foregoing description, it will be obvious that the invention disclosed herein is intended to replace the customary dust cap normally provided on the valve stem of pneumatic tires, the device functioning to act as a dust cap, valve seal and a minimum air responsive and indicating device.

I claim:

1. In combination with a valve stem having a tire valve therein, a tire pressure indicator, said indicator comprising a body having a chamber adjacent one end thereof, a snap diaphragm normally bowed outward and extending across said chamber and sealed to said body in air-tight relation closing said chamber to the atmosphere, said diaphragm being movable between an inward depressed position and a normally bowed outward position with an audible click action, the other end of said body having a threaded bore in communication with said chamber and being detachably secured to the threaded end of a tire valve stem, and a slidable plunger stem extending through said chamber and bore and having one end contacting the inner surface of said diaphragm, the other end of said stem being positioned to contact the valve stem of the tire valve when said diaphragm is moved to the depressed position to thereby release the tire air pressure to within the bore and chamber behind said diaphragm.

2. In combination with a valve stem having a tire valve therein, a tire pressure indicator, said indicator comprising a body having a chamber adjacent one end thereof, a snap diaphragm normally bowed outward and extending across said chamber and sealed to said body in air-tight relation to close said chamber to the atmosphere, said diaphragm being movable between an inward depressed position and a normally bowed outward position with a snap and audible click action, the other end of said body having a threaded bore in communication with the said chamber and being detachably secured to the threaded end of a tire valve stem, a slidable plunger stem extending through said bore and chamber and having one end contacting the inner surface of said diaphragm, the other end of said stem being positioned to contact the valve stem of the tire valve when said diaphragm is moved to the depressed position to thereby release the tire air pressure to within the bore and chamber of said body and behind said diaphragm, and a compression spring mounted within said body to normally urge said plunger and diaphragm towards the outward position.

3. In combination with a valve stem having a tire valve therein, a tire pressure indicator, said indicator comprising a body having a chamber adjacent one end thereof, a snap diaphragm normally bowed outward and extending across said chamber and sealed to the body in air-tight relation to close said chamber to the atmosphere, said diaphragm being movable between an inward depressed position and a normally bowed outward position with a snap and audible click action, the other end of said body having a threaded axial bore in communication with said chamber and being detachably secured to the threaded end of a tire valve stem, a slidable plunger stem extending through the bore and chamber of the body and having one end contacting the inner surface of said diaphragm, the other end of said stem being positioned to contact the valve stem of the tire valve when said diaphragm is moved to the depressed position to thereby release the tire air pressure to within the bore and chamber of said body and behind said diaphragm, a compression spring mounted within said body to normally urge said plunger and diaphragm towards the outward position, and means to vary the compression of said spring.

4. In combination with a valve stem having a tire valve therein, a tire pressure indicator, said indicator comprising a body having a chamber adjacent one end thereof, a snap diaphragm normally bowed outward and extending across said chamber and sealed to the body in air-tight relation to close said chamber to the atmosphere, said diaphragm being movable between an inward depressed position and a normally bowed outward position with a snap and audible click action, the other end of said body having a threaded axial bore in communication with said chamber and being detachably secured to the threaded end of a tire valve stem, a threaded collar member mounted within the threaded bore of said body, said collar member having a bore, a slidable plunger stem slidably and non-rotatably journalled in said collar bore and having one end contacting the inner surface of said diaphragm, the other end of said stem being positioned to contact the valve stem of the tire valve when the diaphragm is moved to the depressed position to thereby release the tire air pressure to within the bore and chamber of said body and behind said diaphragm, a compression spring fitted between said collar and adjacent the end of said plunger stem that is contacting the inner surface of said diaphragm to normally urge said diaphragm to the outward position, said stem being rotatable to rotate said threaded collar and vary the compression of said spring to thus adjust the minimum tire pressure response of the device.

GAVIN WM. LAURIE.

References Cited in the file of this patent

UNITED STATES PATENTS

| Number | Name | Date |
|---|---|---|
| 1,044,779 | Hackley | Nov. 19, 1912 |
| 1,548,470 | Kennedy | Aug. 4, 1925 |
| 1,610,452 | Kennedy | Dec. 14, 1926 |
| 1,618,211 | McNatt | Feb. 22, 1927 |
| 1,731,632 | Main | Oct. 15, 1929 |
| 1,846,311 | Clare | Feb. 23, 1932 |